United States Patent [19]

Eppich

[11] 4,176,783
[45] Dec. 4, 1979

[54] MANUALLY OPERABLE CARD READER INCLUDING COLUMN SENSOR

[75] Inventor: Helmut Eppich, West Vancouver, Canada

[73] Assignee: Ebco Industries, Ltd., Richmond, Canada

[21] Appl. No.: 917,644

[22] Filed: Jun. 21, 1978

[51] Int. Cl.² .......................... G06K 7/14; G08C 9/06
[52] U.S. Cl. .................................. 235/474; 235/458; 235/482; 250/569
[58] Field of Search ....................... 235/472, 482, 458; 250/569

[56] References Cited

U.S. PATENT DOCUMENTS

| 3,496,342 | 2/1970 | Milford | 235/474 |
| 3,529,134 | 9/1970 | Ashworth | 235/474 |
| 3,586,833 | 6/1971 | Schafer | 235/474 |
| 4,114,028 | 9/1978 | Baio et al. | 235/474 |

Primary Examiner—Daryl W. Cook

Attorney, Agent, or Firm—Christensen, O'Connor, Johnson & Kindness

[57] ABSTRACT

A column sensor includes a disc which is rotatably supported at one end of a lever arm and in proximity to a card reading station of a manually operable card reader. The lever arm is itself supported for rotation and biased by a spring bearing on an end of the lever arm so that a circumferential surface of the disc is urged into contact with one of the major boundary surfaces of an elongated passageway in the card reader. As a card is moved through the passageway, incremental rotation of the disc due to contact of the circumferential surface thereof with a surface of the card is detected by a light source - light detector pair mounted on the lever arm and on opposing sides of the disc, with light being coupled from the light source to the light detector through a plurality of circumferentially-spaced, axially-extending apertures in the disc so that the light detector accordingly provides an alternating electrical output signal representative of the spacing of data columns on the card.

18 Claims, 4 Drawing Figures

MANUALLY OPERABLE CARD READER INCLUDING COLUMN SENSOR

FIELD OF THE INVENTION

This invention generally relates to apparatus for reading data from record forms, and more particularly, to a manually operable card reader in combination with a column sensor which provides an electrical output signal related to the spacing of columns on a tabulation card as that card is moved through the card reader.

Background of the Invention

The use of cards containing data recorded thereon in form of punches or perforations is well known. Generally, such cards include a number of columns and rows, with data punches being placed in the various row locations of a column to form a coded data word. For example, one such card commonly used in connection with electronic data processing systems is a standard-sized tabulation card having eighty columns and twelve rows.

A manually operable card reader particularly adapted for the reading of data from such tabulation cards, as well as from smaller cards such as personal identification cards or badges, is disclosed and claimed in my prior patent, U.S. Pat. No. 4,036,430, entitled MANUALLY OPERABLE CARD READER, issued July 19, 1977, and assigned to the assignee of the present invention, the disclosure of which is expressly incorporated herein by reference. In card readers of this type, an elongated passageway is disposed in the card reader, the passageway having an inlet into which the tabulation card is inserted and also having an outlet from which the tabulation card may be drawn, with the length of the passageway between the inlet and the outlet being somewhat less than that of the tabulation card so that the card may be first pushed into the inlet and then pulled from the outlet by the application of a positive manual force to the card. Disposed in proximity to the passageway between its inlet and its outlet is a card reading station which includes a plurality of optical sources and a corresponding plurality of optical sensors respectively arranged, for example, along the top and bottom surfaces of the passageway. The plurality of optical sources and the plurality of optical sensors are each aligned in a direction transverse to the direction of elongation of the passageway, and therefore are each capable of alignment with a single column of a tabulation card through the card reading station. Each optical source is paired with a corresponding optical sensor, with the location of each optical souce - optical sensor pair corresponding to one row of the tabulation card. As the tabulation card is moved through the card reading station, each data location within each card column passes between an optical source and its paired optical sensor. When such a data location includes a punch or perforation, light energy is coupled from the optical source to its paired optical sensor to cause the sensor to supply an electrical signal. Therefore, as the tabulation card is moved through the card reader, the plurality of optical sensors provide a plurality of successive groups of electrical signals, each group corresponding to the data word contained within one column of the tabulation card.

In many applications, it is desirable to organize data words into successive groups or fields, each field comprising a number of successive columns of the tabulation card. A typical application would be an index card for a library which includes separate fields for the title of the indexed work, the author's name, the date of publication, the classification, and so forth. In this application, the number of data words and thus columns in each field is often variable, e.g., the number of data words representing the title of a work will vary from one card to the next. As a result, the fields must be segregated from each other on the tabulation card in order that an electronic data processing system responsive to the electrical signals from the card reader also be able to segregate the information contained in one field from that in a succeeding field.

One way known to the prior art for field segregation on tabulation cards is the use of a predetermined data word, such as that representing a slash, a period, or so forth, in a column as a field limited between successive fields. The electronic data processing system is then programmed, or otherwise made responsive, to such field limiters to appropriately segregate the field information. However, the use of such a predetermined data word as a field limiter is disadvantageous in that the predetermined data word cannot be used to represent information within the field itself.

Therefore, it is more often desirable to utilize a blank column, i.e., one in which none of the data locations has a punch or perforation, as a field limiter. With most card readers, the presence of such blank columns cannot be detected by the card reading station, inasmuch as the number of optical source - optical sensor pairs corresponds to the number of rows on the card, e.g., the number of data locations in each column. As a result, on electrical signals are provided by the card reading station upon the presence of a blank column therein.

In card readers of the type which utilize some sort of drive mechanism for propelling the card through the card reader, this problem can be overcome by providing an encoder which is responsive to rotation or other movement of the drive mechanism. The presence of an output signal from the encoder, and the simultaneous absence of any electrical signals from the card reading station, can therefore be detected by the electronic data processing system to signify the location of a blank column used as a field limiter. In manually operable card readers of the type described in U.S. Pat. No. 4,036,430, however, the problem is not so easily solved inasmuch as there is no mechanism for propelling the card through the card reader. The problem can be overcome, in one instance, by providing a separate timing track, typically including a magnetic strip which is modulated in the row-wise direction of the card at intervals corresponding to column spacings, and by detecting the timing track by use of a magnetic reading head to therefore provide an electrical signal similar to that provided by the encoder used in mechanically driven card readers. This approach is disadvantageous, however, in requiring modification to the standard tabulation card normally used. It also requires additional circuitry and component elements for detection of the timing track. As another instance, one of the rows normally used for data locations on the card can be dedicated as a column indicator by totally punching out the row along its length. The dedicated row is used in a manner similar to that of the timing track, with an electrical signal from the optical source - optical sensor pair responsive to the dedicated row indicating the presence of a column on the card. This approach is also disadvantageous in that it reduces the number of data locations in each column, and therefore restricts the number of data words that can be represented in each column.

It is therefore an object of this invention to provide a column sensor in combination with a manually operable card reader, the column sensor being capable of providing an output signal which can be used to detect the absence of a data word, or a blank column, on a tabulation card being passed through the card reader.

It is a further object of this invention to provide such a column sensor for providing an output signal which can be used to count the number of columns that have passed a card reading station of the manually operable card reader.

It is another object of this invention to provide such a column sensor which provides an output signal related to the spacing of columns on a tabulation card being moved through the manually operable card reader.

It is yet another object of this invention to provide such a column sensor which provides an output signal which can be used to determine the presence of blank columns used as field limiters on a tabulation card.

It is still another object of this invention to provide such a column sensor which is inexpensive to construct and to install, and whose installation requires no significant modification to the structure of the manually operable card reader.

It is also an object of this invention to provide such a column sensor which requires no modification to the tabulation card itself, and which yet accurately and precisely determines the locations of columns on the tabulation card as the card is moved through the manually operable card reader.

It is an additional object of this invention to provide such a column sensor which is mechanically driven by the tabulation card as the card is moved through the manually operable card reader to provide an output signal related to column location or spacing on the tabulation card.

SUMMARY OF THE INVENTION

The foregoing objects, and additional objects and advantages that will be apparent to those of ordinary skill in the art, are achieved by the combination of a manually operable card reader and a column sensor. The manually operable card reader is adapted for reading coded data punches arranged in longitudinally-extending rows and transversely-extending columns on an elongated tabulation card and comprises a card guide means having defined therein first and second card openings and an elongated passageway having a pair of oppositely disposed major boundary surfaces and a pair of oppositely disposed minor boundary surfaces. The passageway is dimensioned for the passage of a tabulation card and interconnects the first and second card openings. The manually operable card reader further comprises a card reading station for supplying a plurality of electrical signals representative of the coded data punches, the card reading station being positioned along the elongated passageway between the first and the second card openings, and supplying the plurality of electrical signals as the card is manually moved through said passageway.

The column sensor is particularly adapted for providing an output signal relating to the spacing of columns of the card as the card is moved through the passageway, and includes a substantially cylindrical member having a circumferential surface. A first means supports the cylindrical member in proximity to the card reading station for rotation about an axis substantially transverse to the direction of elongation of the passageway, the first means being further adapted to resiliently urge the circumferential surface of the cylindrical member into contact with one of the pair of major boundary surfaces. The second means is responsive to incremental rotation of the cylindrical member as the card is moved through the passageway for providing the desired output signal.

In a preferred embodiment, the first means includes a lever arm having first and second ends, the cylindrical member being supported for rotation at the first end of the lever arm. Means supports the lever arm at a point between its first and second ends for rotation about an axis transverse to the direction of elongation of the passageway, and resilient means is provided which tends to rotate the lever arm about its axis of rotation in a predetermined direction so as to urge the circumferential surface of the cylindrical member into contact with one of the pair of major boundary surfaces.

In a preferred embodiment, the second means includes a plurality of encoded elements which are located on the cylindrical member, the plurality of encoded elements being substantially equidistantly spaced from each other in a circumferential direction of the cylindrical member, and detector means mounted on the lever arm for providing a discrete change of the level of the output signal when each of the plurality of encoded elements comes into proximity with the detector means upon rotation of the cylindrical member. Preferably, each of the plurality of encoded elements comprises an aperture extending through the cylindrical member in the direction parallel to the axis of rotation thereof, the plurality of apertures being located at a common radius from the axis of rotation. Preferably, the detector means comprises a light source and a light detector respectively located on the lever arm on opposing sides of the cylindrical member, the light source and light detector being aligned in a direction parallel to the axis of rotation of the cylindrical member and being spaced from this axis of rotation by an amount substantially equal to the common radius of the plurlity of apertures.

BRIEF DESCRIPTION OF THE DRAWINGS

The invention can best be understood by reference to the following portion of the specification, taken in conjunction with the accompanying drawings, in which.

DESCRIPTION OF THE PREFERRED EMBODIMENT

Figure 1:
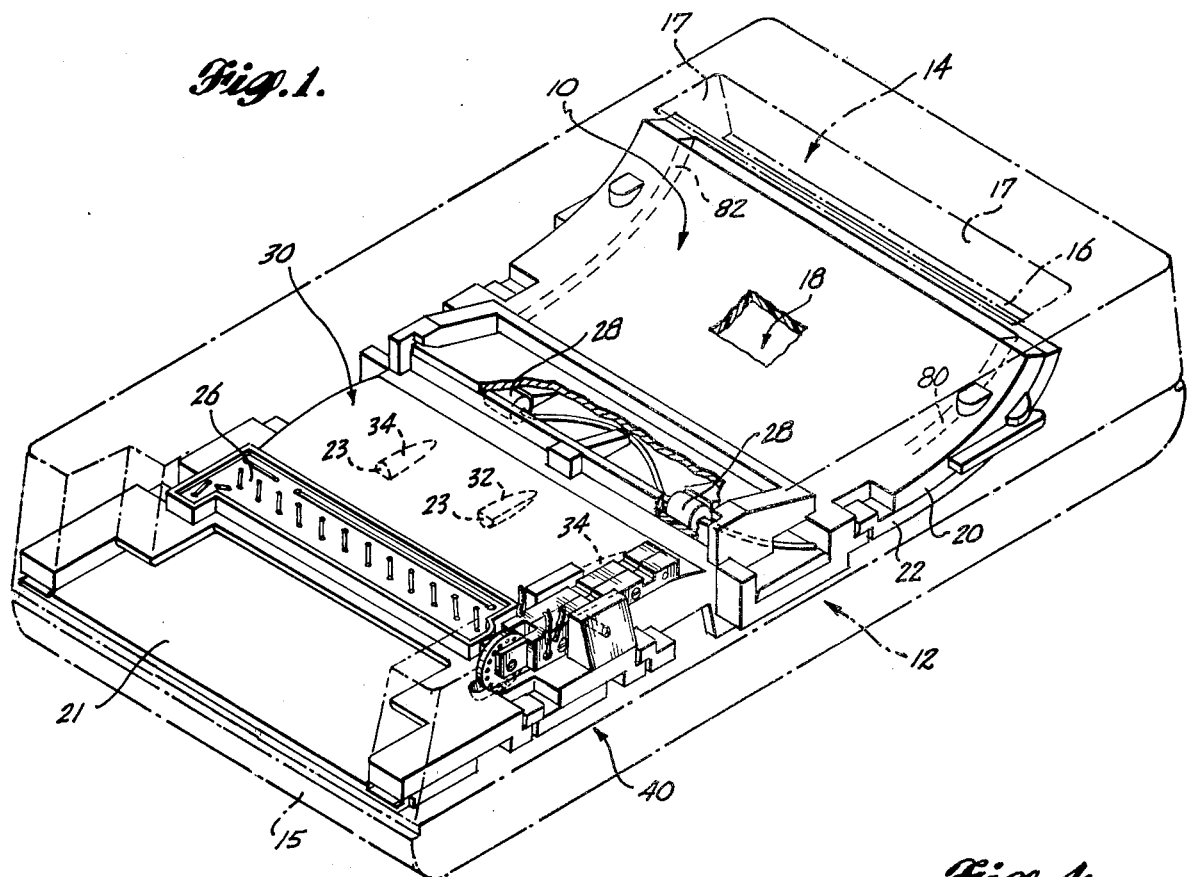
FIG. 1 is a partially cut away perspective view of a manually operable card reader and a column sensor constructed according to the present invention.

Referring to FIG. 1, a card reader (denoted generally by the numeral 10) similar to that disclosed in U.S. Pat. No. 4,036,430 is illustrated within a generally rectangular housing 12. Housing 12 is any convenient housing configured for containing the card reader 10 and can also be configured for containing an additional apparatus that may be used in conjunction with the card reader 10. For example, in some instances card reader 10 may be used in conjunction with electronic circuitry for performing mathematical calculations based on the data supplied by card reader 10.

In the depicted arrangement, the housing 12 includes a recessed card opening 14 extending transversely across the upper surface of the housing 12 near one end thereof. The card opening 14 is arranged for receiving punched cards, such as standard tabulation cards having eighty columns and twelve rows for the recording of punched data. The card reader is mounted within the housing 12 to extend along the length of the housing between the card opening 14 and a housing end wall 15. Preferably, the recessed opening 14 is rectangular in shape and includes four inwardly sloping walls 17 that form a converging rectangular throat for directing a card into the card reader 10. As a card is inserted into the opening 14, the card is directed into a first opening 16 of a slotted passageway 18 that is formed between an upper plate 20 and a lower plate 22 of card reader 10. Relative to the direction of card travel through the passageway 18, the passageway 18 first curves downwardly and then extends substantially parallel to the upper and lower surfaces of the housing 12 to a second card opening 24.

The second card opening 24 is formed between the upper plate 20 and lower plate 22 and the housing end wall 15 is recessed or contoured to permit access to the opening 24. As shown in FIG. 1, the upper plate 20 does not extend outwardly over the lower plate 22 at the housing end wall 15, but is notched or cut away to expose a portion of the upper surface of the lower plate 22. The lower plate 22 extends outwardly to join with the housing end wall 15 and a portion of the end wall 15 that is located above the upper surface of the exposed portion of the lower plate 22 is contoured to correspond to a notched recess formed in the upper plate 20. Thus, the lower plate 22 effectively forms a horizontal platform 21 extending outwardly to the housing end wall 15 from the card opening 24 that is defined between the upper surface of lower plate 22 and the notched terminating end of the upper plate 20. Since the length of the passageway 18 is less than the longitudinal dimension of a standard tabulation card, a card inserted into the card opening 16 and pushed through the passageway 18 emerges from the card opening 24 with the end portion of the card lying on the platform 21. The card can then be easily grasped by the card reader operator and pulled from the opening 24.

A card reading station 26, located adjacent the second card opening 24, successively reads the data punched in each of the card columns as the card is pulled through the opening 24. The card reading station 26 includes a number of optical sources 26A and optical sensors 26B (refer to FIGS. 4 and 3, respectively) with the optical sources 26A being disposed along the top plate 20 and the optical sensors 26B being disposed along the bottom plate 22. The optical sources and optical sensors are mounted in alignment with one another and are spaced such that each data location within each card column passes between an optical source and its corresponding optical sensor. When such a data location includes a punch or perforation, light energy is coupled between the associated optical source and sensor to cause the sensor to supply an electrical signal.

As a card which is to be read at the card reading station 26 is pushed through the card reader opening 16, the card first passes through the curved portion of passageway 18 and then passes between two spring loaded rollers 28. The spring loaded rollers 28 are arranged such that once the leading edge of the card has passed beneath the rollers, the card cannot be pulled back through the opening 16. Since the spring loaded rollers 28 insure that the card can only be moved past the reading station 26 in a single direction, "double reading" of the data recorded on the card is prevented. That is, since the card cannot be pulled back through the opening 16 after one or more columns of data are read at the reading station 26, previously read data columns cannot be moved past the reading station 26 in a reverse direction to generate erroneous electrical signals.

After passing beneath the spring loaded rollers 28, the leading edge of the card passes through a portion of the passageway 18 that may conveniently be identified as a badge stop region 30. Badge stop region 30 is arranged to permit a card inserted in the card reader opening 16 to pass through the passageway 18 and be manually withdrawn from the opening 24 while simultaneously preventing a card or badge that is inserted through the card reader opening 24 from passing more than a predetermined distance through the passageway 18. The badge stop region 30 is formed within a longitudinal section of passageway 18 wherein the upper plate 20 has an arcuate shaped longitudinal cross section (refer to FIG. 3). A badge stop ridge 32 is longitudinally mounted along the lower surface of the upper plate at the approximate centerline of passageway 18 and two badge stop ridges 34 are longitudinally mounted along the upper surface of the lower plate 22 with the ridge 34 located between each edge of passageway 18 and the badge stop ridge 32. Ridges 32 and 34 are of increasing height relative to the direction of card travel when a card is pulled from the open end 24, with the end face 23 of each ridge nearestmost the opening 24 being greater than one-half the height of the passageway 18 at that location and being substantially perpendicular to the upper surface of the lower plate 22. The ends of ridges 32 and 34 nearestmost card opening 16 smoothly join the respective lower and upper surfaces of the upper and lower plates 20, 22. Since conventional tabulation cards are relatively flexible, the ridges 32 and 34 do not impair the passage of a card that is inserted in opening 16 and pulled from the opening 24. However, when a card or badge is inserted in opening 24 and pushed through the passageway 18, the leading edge of the card strikes the orthogonal faces 23 of the ridges 32 and 34 and is prevented from travelling further.

In view of this arrangement, it can be recognized that the card reader 10 is configured to read punched data from a card inserted in an opening 16 and pulled from opening 24 or alternatively to read punched data from a card or badge that is inserted into the card reader opening 24. Further, it will be recognized that the card reader 10 is configured such that frictional forces are exerted on a card as it is pulled through the passageway 18. More explicitly, the spring loaded rollers 28 and the arrangement of the badge stop region 30 each cause a card to be subjected to rather predictable frictional forces. Further, the curved portion of the passageway 18 causes such a card to frictionally contact at least a portion of the pair of major boundary surfaces of the passageway 18 (e.g., the lower surface of upper plate 20 and the upper surface of lower plate 22). These frictional forces regulate the force required to pull a card through the passageway 18. Since such frictional forces inherently increase as the pulling force is increased, the speed at which the card can be pulled from the card opening 24 tends to be maintained within a predetermined velocity range. Exercising some regulation over the speed at which the card can be pulled through the passageway 18 is advantageous in that the manual operation thereby requires a substantially constant operational force regardless of the normal variations in parameters such as the card thickness or composition of the card. Further, such speed regulation is advantageous in that the electrical signals representative of the information recorded in each card column are supplied at a rate that is compatible with essentially all systems utilizing punched card information.

Moreover, the curved shape of the passageway 18 is advantageous in that tabulation cards that have become somewhat bent or crumpled due to mishandling are straightened as the card is pushed through the passageway 18. Thus, such a card passes through the card reading station 26 with the data columns and end rows in proper alignment with the optical sources and optical sensors.

Figure 2:
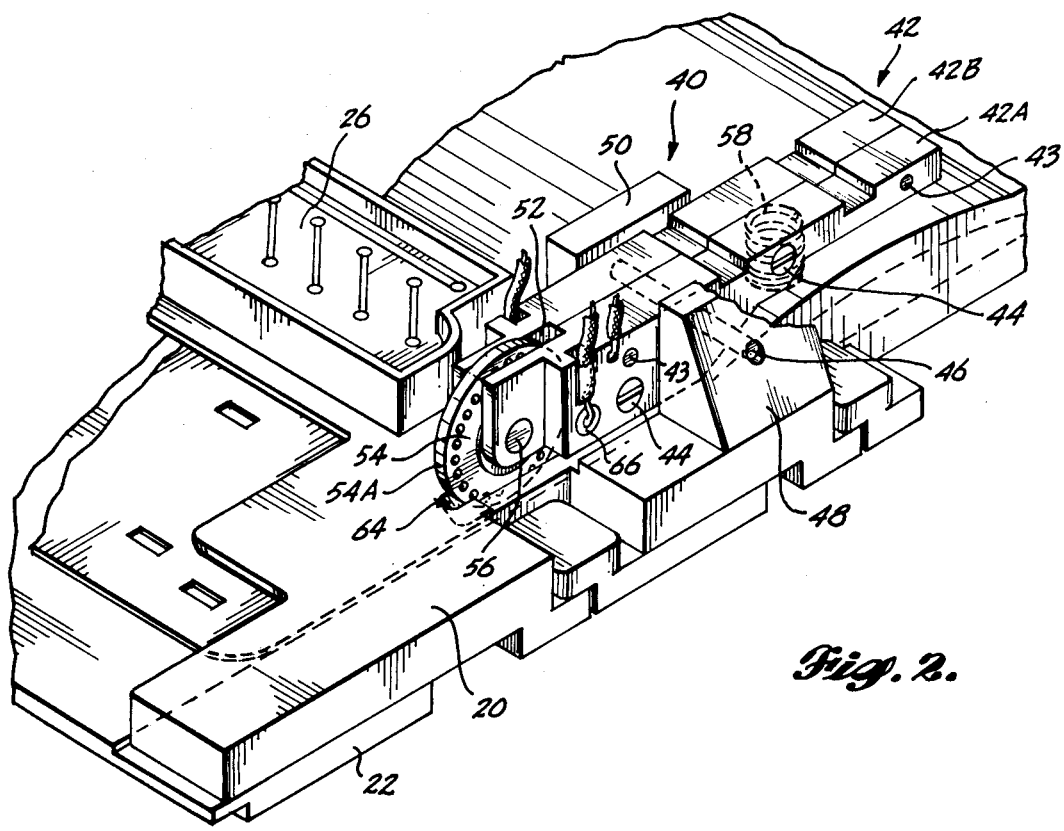
FIG. 2 is an expanded view of a portion of the card reader illustrated in FIG. 1 and particularly illustrating the structure of the column sensor.

To this point, the manually operable card reader that has been described is similar to that disclosed in U.S. Pat. No. 4,036,430, and reference should be made to that patent for further structural and operational details of the reader. The present invention relates to the addition of a column sensor 40 to the card reader, the column sensor being located in proximity to the card reading station 26 and operable to provide an electrical output signal related to the spacing or location of the columns on the tabulation card as that card is moved through the passageway 18, and, more particularly, through the card reading station 26, as will now be described with particular reference to FIGS. 2-4.

The column sensor 40 includes a lever arm 42 which is divided into first and second, complementary halves 42A, 42B which are each a mirror image of the other and which are joined together by a plurality of fasteners 44. A plurality of pins 43 also are received in corresponding apertures of lever arm halves 42A, 42B to insure precise alignment upon assembly for reasons that will become apparent from the ensuing discussion. The lever arm 42 is rotatably supported above the upper plate 20 by a pin 46 which passes through a portion of lever arm 42 intermediate its ends and which is received in corresponding apertures in first and second, spaced-apart projections 48, 50 extending from the upper surface of upper plate 20. At its end nearest card reading station 26, lever arm 42 is bifurcated to define a notch 52 which is formed by corresponding indentations in the adjacent surfaces of lever arm halves 42A, 42B. A substantially cylindrical member, in this case a disc 54, is located partially within the notch 52 and is supported for rotation by a shaft 56 passing through the axis of disc 54 and being received in corresponding, aligned apertures in the ends of lever arm halves 42A, 42B adjacent the card reading station 26. As can best be seen in FIGS. 2 and 3, a portion of the disc 54 extends through an elongated aperture 64 in upper plate 20 and into the passageway 18 so that a circumferential surface 54A of disc 54 is capable of contacting a portion of the upper surface of lower plate 22. A coil spring 58 is received in a notch 60 located in the lower surface of the end of the lever arm 42 away from the card reading station 26 and also in a corresponding notch 62 located in the upper surface of the upper plate 20 in the vicinity of the badge stop region 31 of the card reader, with the coil spring 58 functioning to rotate the lever arm 42 about the pin 46 to therefore press the circumferential surface 54A of disc 54 into contact with the upper surface of lower plate 22. The disc 54 is provided with a plurality of encoded elements, in this case a plurality of axially extending apertures 72 which are located at a common radius from the axis of rotation of disc 54 and adjacent the circumferential surface 54A, with the apertures 72 also being equidistantly spaced from each other in the circumferential direction of disc 54.

Figure 4:
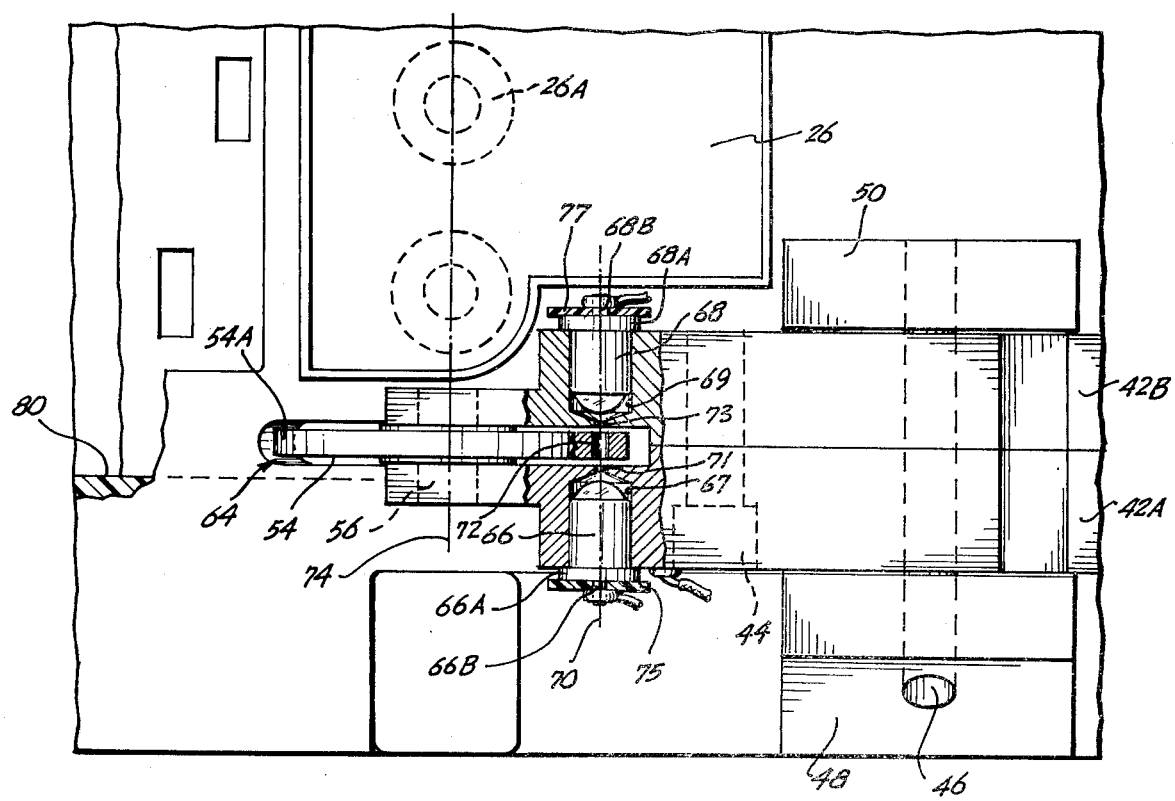
FIG. 4 is a top plan view, in partial cut away, of a portion of the column sensor and associated portions of the card reader.

With particular reference now to FIG. 4, a detector for the encoded elements on disc 54 comprises a light source 66 located in lever arm half 42A and a light detector 68 located in lever arm half 42B, with light source 66 and light detector 68 being aligned along a common axis 70 which is transverse to the direction of elongation of lever arm 42 and which is spaced from the axis of rotation of disc 54 by an amount equal to the common radius of apertures 72. More specifically, the light source 66 may comprise a light emitting diode, of a type commercially available from Spectronics, Inc. as model SE 1455, which is received and appropriately secured in a bore 67 in lever arm half 42A, and light detector 68 may comprise a phototransistor, of a type commercially available from Spectronics, Inc. as model 5D 1445 which is received and secured in a bore 69 in lever arm half 42B. A small aperture 71 extends from bore 67 to the surface of lever arm half 42A defining in part the notch 52, and a small aperture 73 extends from the bore 69 to the surface of lever arm half 42B defining in part the notch 52. Apertures 71 and 73 are arranged so as to be coaxial with the axis 70 of the light source 66 and light detector 68, and preferably have a diameter which is substantially equal to that of each aperture 72 in the disc 54. As a result, rotation of the disc 54 causes the light beam transmitted by light source 66 to be successively coupled to light detector 68 as each aperture 72 is successively brought into alignment with the common axis 70 so that light detector 68 provides an alternating electrical signal.

As best seen in FIG. 4, both halves 42A, 42B of the lever arm 42 are made of conducting material, and an electrical ground connection may be made to the lever arm 42 by means of a lead soldered or otherwise connected thereto. To ground light source 66, one terminal of the light emitting diode within light source 66 is internally connected to an integral shoulder 66A thereof which has a diameter slightly larger than that of the bore 67 so as to engage a corresponding portion of the outer surface of lever arm 42A surrounding bore 67. Shoulder 66A also functions to limit the amount that the light source 66 can be inserted into the bore 67. A similar shoulder 68A is provided on the light detector 68 and internally connected with one terminal of the phototransistor therein, with shoulder 68A engaging a corresponding portion of the outer surface of lever arm 42B surrounding bore 69 to provide the desired electrical ground connection and to limit the amount that light detector 68 can be inserted into bore 69. Light source 66 and light detector 68 are also respectively provided with centrally located, projecting terminals 66B, 68B which are internally connected to corresponding terminals of the respective light emitting diode and phototransistor therein and to which are respectively connected a lead for applying power to the light source 66 and a lead for coupling the electrical output signal from light detector 68 to associated electrical circuitry. Washers 75, 77, of insulating material, respectively surround terminals 66B, 68D and respectively abut shoulders 66A, 68A to prevent electrical shorts therebetween by the leads soldered or otherwise connected to terminals 66B, 68B.

Figure 3:
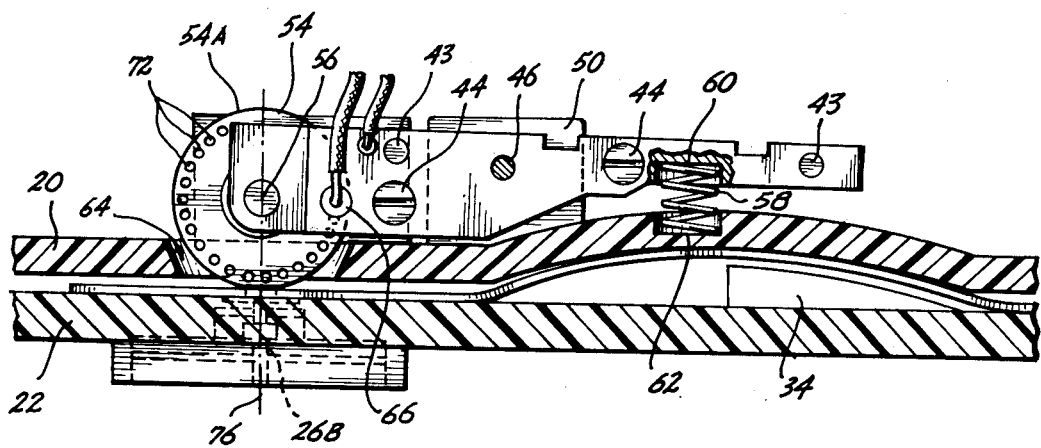
FIG. 3 is a cross sectional view of a portion of the card reader and illustrating the column sensor in detail.

In operation, a tabulation card is inserted through card opening 14, enters the first opening 16 in the passageway 18, and is then pushed through the curved portion of the passageway 18, past the spring loaded rollers 28 and through the badge stop region 30 until the leading edge of the tabulation card enters the card reading station 26. As the tabulation card is further moved through the passageway 18 toward the second card opening 24, the interposition of the leading edge of the card between the circumferential surface 54A and the upper surface of lower plate 22 causes the lever arm 42 to be rotated in a clockwise direction, as viewed in FIG. 3, against the force of the spring 58 so that the circumferential surface 54A now bears against the upper surface of the tabulation card. Further movement of the passageway 18 thereafter causes the disc 54 to be rotated by an amount directly related to the amount of travel of the card through the passageway 18. As the card moves through the passageway 18 and the disc 54 rotates, the apertures 72 are successively interposed between the light source 66 and light detector 68 so that light detector 68 provides an electrical output signal whose level varies between alternating first and second peak values. Assuming no slippage of the disc 54 with respect to the tabulation card, the periodicity of this electrical output signal from the column sensor 40 has a fixed relationship to the spacing or location of the columns on the tabulation card, which relationship is determined by the circumferential spacing of the apertures 72, the common radius of apertures 72, and the diameter of circumferential surface 54A of disc 54. Preferably, the output signal from the column sensor 40 goes through two complete cycles for every increment of travel of the tabulation card through the passageway 18 corresponding to the separation between adjacent columns. As best seen in FIGS. 3 and 4, the axis of rotation of the disc 54 is preferably aligned with a columnwise extending centerline 74 of the optical source - optical sensor pairs 26A, 26B in the card reading station 26, and is further normal to the centerline 76 of each optical source - optical sensor pair. Accordingly, the column sensor 40 will begin to provide an output signal at the same time that the leading edge of the card passes through the card reading station 26 so that the output signal from the column sensor 40 is provided for substantially the entire length of the tabulation card.

It will therefore be seen that the column sensor provides an electrical output signal which is quite similar to that provided by the column sensors of the prior art which are responsive to a timing track or to a dedicated row, but is advantageous thereover in not requiring such a timing tack or dedicated row for its operation.

As a matter of design, it should be noted that the force exerted by the spring 58, and the length of the lever arm 42, should be chosen so that the force exerted on the tabulation card at the point of its contact with the circumferential surface 54A of disc 54 is sufficient to inhibit any slippage of disc 54 relative to the tabulation card, but yet is not great enough to prevent the leading edge of the tabulation card from being interposed between the disc 54 and lower plate 22 or great enough to significantly increase the amount of manual force that is required to move the tabulation card through the passageway 18. Also, the axis of rotation of the disc 54 does not have to be precisely aligned with the card reading station 26 as in the present embodiment, but is only required to be located in proximity to the card reading station 26 so that the disc 54 is rotated for that portion of the length of the tabulation card in which columns are located.

Due to the location of the column counter 40 in the preferred embodiment at one side of the card reading station 26, and in proximity to one of the pair of minor boundary surfaces of passageway 18 (e.g., surfaces 80, 82 respectively shown in FIGS. 4, 1 and formed by the upper plate 20 as disclosed in U.S. Pat. No. 4,036,930), the manually operable card reader described in U.S. Pat. No. 4,036,430 need be modified only in the addition of the projections 48 and 50 to upper plate 20 and the provision of the slotted aperture 64 in upper plate 20. However, the present invention also contemplates other locations of the column sensor 40 in proximity to the card reading station 26, e.g., a location in which the disc 54 protrudes through an aperture in the center of the card reading station 26. Finally, the location of the column counter 40 in proximity to the card reading station 26 allows the column counter to provide an output signal for cards or badges inserted into the second card opening 24, as well as the card opening 14, since the disc 54 is free to rotate in opposite directions.

While the invention has been described with reference to a preferred embodiment, it is to be clearly understood by those skilled in the art that the invention is not limited thereto, but rather that the limits of the invention are to be interpreted only in conjunction with the appended claims.

The embodiments of the invention in which an exclusive property or privilege is claimed are defined as follows:

1. In combination with a manually operable card reader for reading coded data punches arranged in longitudinally-extending rows and transversely-extending columns on an elongated tabulation card, said manually operable card reader comprising a card guide means having defined therein first and second card openings and an elongated passageway having a pair of oppositely disposed major boundary surfaces and a pair of oppositely disposed minor boundary surfaces, said passageway being dimensioned for the passage of said tabulation card and interconnecting said first and said second card openings, and further comprising a card reading station for supplying a plurality of electrical signals representative of said coded data punches, said card reading station being positioned along said elongated passageway between said first and said second card openings and supplying said plurality of said electrical signals as said card is manually moved through said passageway;

a column sensor for providing an output signal related to the spacing of columns on said card as said card is moved through said passageway, said column sensor including:

(a) a substantially cylindrical member having a circumferential surface;

(b) first means supporting said cylindrical member in proximity to said card reading station for rotation about an axis substantially transverse to the direction of elongation of said passageway, said first means being further adapted to resiliently urge said circumferential surface of said cylindrical member into contact with one of said pair of major boundary surfaces, and (c) second means responsive to incremental rotation of said cylindrical member as a card is moved through said passageway for providing said output signal representative of the spacing of columns on said card.

2. The combination as recited in claim 1, wherein said first means includes: a lever arm having first and second ends, said cylindrical member being supported for rotation at said first end of said lever arm; means supporting said lever arm, at a point between said first and second ends, for rotation about an axis transverse to the direction of elongation of said passageway; and, resilient means which tends to rotate said lever arm about its axis of rotation in a predetermined direction so as to urge said circumferential surface of said cylindrical member into contact with said one of said pair of major boundary surfaces.

3. The combination as recited in claim 2, wherein said resilient means comprises a spring exerting a force on said second end of said lever arm so as to tend to rotate said lever arm in said predetermined direction.

4. The combination as recited in claim 2, wherein said second means includes: a plurality of encoded elements which are located on said cylindrical member, said plurality of encoded elements being substantially equidistantly spaced from each other in a circumferential direction of said cylindrical member; and, detector means mounted on said lever arm for providing a discrete change in the level of said output signal when each of said plurality of encoded elements comes into proximity with said detector means upon rotation of said cylindrical member.

5. The combination as recited in claim 4, wherein each of said plurality of encoded elements comprises an aperture extending through said cylindrical member in the direction parallel to said axis of rotation thereof, said plurality of apertures being located at a common radius from said axis of rotation, and wherein said detector means comprises a light source and a light detector respectively located on said lever arm on opposing sides of said cylindrical member, said light source and said light detector being aligned in a direction parallel to the axis of rotation of said cylindrical member and being spaced from said axis of rotation by an amount substantially equal to said common radius of said plurality of apertures.

6. The combination as recited in claim 5, wherein said light source comprises a light emitting diode.

7. The combination as recited in claim 5, wherein said light detector comprises a phototransistor.

8. The combination as recited in claim 5, wherein said light source comprises a light emitting diode and wherein said light detector comprises a phototransistor.

9. The combination as recited in claim 8, wherein said lever arm is bifurcated at least at said first end thereof to therefore define a notch in which said cylindrical member is supported for rotation, said notch being formed in part by spaced apart, opposing surfaces of said lever arm, and further including first and second bores in said lever arm for respectively receiving said light emitting diode and said phototransistor, and first and second, aligned apertures respectively extending from said first and said second bores to said opposing surfaces of said notch, said first and said second apertures being spaced from said axis of rotation of said cylindrical member by an amount substantially equal to the common radius of said plurality of apertures in said cylindrical member.

10. The combination as recited in claim 9, wherein the diameter of said plurality of apertures in said cylindrical member, and the diameter of said first and said second apertures, are substantially equal.

11. The combination as recited in claim 4, wherein said second means includes: a plurality of encoded elements which are located on said cylindrical member, said plurality of encoded elements being substantially equidistantly spaced from each other in a circumferential direction of said cylindrical member; and, detector means for providing a discrete change in the level of said output signal when each of said plurality of encoded elements comes into proximity with said detector means upon rotation of said cylindrical member.

12. The combination as recited in claim 11, wherein each of said plurality of encoded elements comprises an aperture extending through said cylindrical member in a direction parallel to said axis of rotation thereof, said plurality of apertures being located at a common radius from said axis of rotation, and wherein said detector means comprises a light source and a light detector disposed on opposing sides of said cylindrical member, said light source said light detector being aligned in a direction parallel to the axis of rotation of said cylindrical member and being spaced from said axis of rotation by an amount substantially equal to said common radius of said plurality of apertures in said cylindrical member.

13. The combination as recited in claim 12, wherein said light source comprises a light emitting diode.

14. The combination as recited in claim 12, wherein said light detector comprises a phototransistor.

15. The combination as recited in claim 12, wherein said light source comprises a light emitting diode and wherein said light detector comprises a phototransistor.

16. The combination as recited in claim 1, wherein the other one of said pair of major boundary surfaces has defined therein an elongated aperture, and wherein said first means supports said cylindrical member so that said cylindrical member partially projects through said elongated aperture into said passageway, with said circumferential surface thereof contacting said one of said pair of major boundary surfaces.

17. The combination as recited in claim 1, wherein said card reading station includes a plurality of optical sources mounted in alignment along one of said pair of major boundary surfaces and transversely to the direction of elongation of said passageway, and a plurality of optical sensors mounted in alignment along the other of said pair of major boundary surfaces and also transversely to the direction of elongation of sais passageway, said plurality of optical sources and said plurality of optical sensors being arranged in a predetermined number of pairs for detecting coded data punches in the row locations of each column of a card manually moved through said passageway, and wherein said axis of rotation of said cylindrical member is substantially aligned with said transversely-aligned extending alignment of said plurality of optical source and said plurality of optical sensors of said card reading station.

18. The combination as recited in claim 1, wherein said first means supports said cylindrical member so that said cylindrical member is located in proximity to one of said pair of minor boundary surfaces of said passageway.

* * * * *